Nov. 3, 1959 E. R. KRETZMER 2,911,463

HIGH RESOLUTION SCANNING SYSTEM

Filed Dec. 30, 1957

INVENTOR
E. R. KRETZMER
BY Harry C. Hart
ATTORNEY

United States Patent Office 2,911,463

Patented Nov. 3, 1959

2,911,463

HIGH RESOLUTION SCANNING SYSTEM

Ernest R. Kretzmer, New Providence, N.J., assignor to Bell Telephone Laboratories, Incorporated, New York, N.Y., a corporation of New York Application December 30, 1957, Serial No. 705,976

11 Claims. (Cl. 178—6)

This invention relates to the translation, transmission, reception and reproduction of electric image signals and the like, and more particularly to a scanning system for low resolution applications.

Progress in electronic picture transmission, facsimile and related fields has developed to such an extent that text or pictorial information may now be economically and accurately transmitted from one location to another. Although the advances in these fields have made possible the development of systems having relatively low cost, ease of operation and reliability, there remains the economic need for a reduction in the electrical channel width required for such electric signals, together with an accompanying increase in the speed of transmission.

In the field of facsimile, transmission economy in each of these respects may be attained by analyzing successively the optical densities of individual elements of the printed text or pictorial copy to be transmitted with an electron beam, spot of light, or the like, whose linear dimensions are substantially greater than those of the finest detail in the copy. Although such a process of instantaneously exploring the individual elements of the copy with an enlarged aperture to produce their electrical signal counterparts, commonly called scanning, permits the transmission time to be held to a suitably short period of time, it is, of course, at the expense of signal resolution. Moreover, fine detail portions of the material, i.e., those having smaller linear dimensions than the scanning aperture, may be lost altogether so that the facsimile service loses its intended usefulness. These effects are generally referred to as "aperture effects."

In an application of J. R. Hefele, Serial No. 677,583, filed August 12, 1957 a facsimile system is disclosed which effectively prevents such losses and yet effects a substantial reduction in the bandwidth-time product of signals transmitted thereover. Transmission economy is achieved by selecting the channel bandwidth, the speed of transmission, and the resolution necessary for a just satisfactory reproduction at the receiver station in strict accordance with the character of the particular service to be rendered and with the nature of the material to be transmitted. Fine detail components of the signal are preserved during transmission over a channel having a reduced bandwidth-time product by scanning with a small dimension aperture and by predistorting selected ones of the derived components in a preassigned fashion prior to transmission. More particularly, the signals describing the very thinnest lines contained in the material are modified prior to transmission in two significant respects. First, successively derived electrical signals are restricted, by signal slicing for example, to either one of two values, e.g., black and white, without intermediate shades and, second, each derived pulse representative of a narrow vertical line in the copy whose width is less than a preassigned minimum is converted to a pulse whose width is equal to or greater than the preassigned minimum. Thus, although the signals, as modified, still contain the essential characteristics of the original signal, they have been converted to a form which is in some respects superior to the original and is, moreover, especially tailored to the definition demands of the intended service and the accommodation of the transmission channel. Neither of these departures in any way reduces the intelligibility of the copy but oftentimes enhances its readability. At the receiver station, the modified signals are immediately available for producing a pictorial record of the copy with a normally large scanning beam without the necessity of a reconversion to their original unmodified form. This is, of course, a great advantage since it markedly reduces the complexity of the receiver terminal equipment.

Horizontal detail is faithfully preserved in the aforementioned Hefele application by scanning the field of view with an effective scanning aperture or spot of smaller than normal dimensions in the direction of scanning. For convenience, this is termed the X direction. Since the vertical resolution requirements may be somewhat relaxed without seriously impairing the reproduction, the total number of scanning lines per field is substantially reduced, i.e., the distance separating successive lines is increased. To prevent thin lines positioned at small angles with respect to the scanning or X direction from being missed in the scanning process, the scanning aperture is elongated in a direction perpendicular to the direction of scanning. This is conveniently termed the Y direction. Nevertheless, those thin lines embraced by only a small fraction of the scanning aperture tend to dilute the output signal to a value below the slicing level of the processing amplifier so that these signals may be lost altogether prior to transmission. Although this effect may be minimized by lowering the slicing level, the saving is at the expense of the signal-to-noise ratio.

It is a principal object of the present invention measurably to improve the resolution capabilities of a transmission system in both coordinate directions while simultaneously effecting a substantial reduction the width of the required transmission frequency band as compared with the bandwidth required for transmission in accordance with the methods commonly in use.

It is another object of the invention to retain the effects of high resolution scanning in low resolution scanning systems without the attendant disadvantages outlined above.

According to the present invention, an image field of view is repeatedly and systematically explored with a high resolution aperture in a manner to increase substantially the total area explored in each traverse thereby to obtain a sequence of electrical signal pulses representative of the light values of individual elements of the field. The sequence of electrical pulses is suitably modified prior to transmission to render it more suitable for transmission over a channel having a reduced bandwidth-time product without an attendant loss of the essential information-carrying characteristics of the sequence.

More particularly, a field of view to be transmitted is initially converted to a sequence of electrical analogue signals by scanning with an effective scanning aperture of smaller than normal linear spot dimensions both in the direction of scanning and in a direction perpendicular thereto. Successive scanning lines follow substantially parallel paths in the X direction of the field spaced apart in the Y direction by a distance greater than the aperture dimensions. In order that the peak-to-peak value of the signals derived from the scanner represents satisfactorily the peak-to-peak reflectance characteristic of the copy, the scanning spot dimensions in both the X and Y directions are preferably smaller than the dimensions of the smallest detail in the subject copy. The amount of detail converted by this process is substantially increased by imparting to the scanning spot during each normally straight scanning path in the X direction, an additional oscillatory component of motion in the Y direction. The waveform employed to produce this additional motion may conveniently be sinusoidal although other oscillation waveforms may, of course, be used.

Scanning of the subject copy with a high definition spot faithfully preserves in electrical form the finest detail explored by the spot, and the technique of imparting to the spot an oscillatory motion about the normal scanning path during each traverse of the field substantially increases the total area explored thereby to increase correspondingly the detail content of the electrical analogue counterparts. It does this without, however, correspondingly increasing the required number of scanning traverses per field or the line scanning frequency. It also assures a wide distribution of the intercept angle between the scanning path and the object contours within the pictorial matter. Inasmuch as the receiver scanning process need not be modified in any way, the receiver scanning beam is normally large as compared with the transmitter scanning aperture. Thus, the irregularities in the order of scanning in each successive traverse of the copy are effectively masked at the receiver.

High definition exploration of the entire field of view, notwithstanding, propagation of the electrical signal counterparts over a bandwidth limited system may result in a substantial loss in peak amplitude of the shorter analogue signal pulses. This loss may be of such an extent that these pulses are lost altogether. As discussed in the aforementioned Hefele application, it has been found that the absolute width of the lines forming the finest parts of typed characters or strokes of written material need not be preserved accurately so long as the spatial configurations and form of the characters or strokes are preserved. It is in accordance with the present invention to alter the characteristics of the pulses, derived in the oscillatory scanning process and representative of the thinnest lines in the copy, by effectively reenforcing them before transmission so that their peak amplitudes are preserved. The analogue pulses emanating from the scanner are therefore stretched in accordance with one of various stretching programs. A simple possibility is to stretch all pulses by a constant amount. However, this means that a pulse which is already of adequate duration for transmission is stretched unnecessarily. In accordance with a preferred embodiment of the invention, a stretching program is followed in which only pulses shorter than those resulting from scanning with an aperture, whose dimension in the X direction corresponds in time to the period D, are stretched in duration to D while all longer pulses are left completely unchanged. In this form of nonlinear stretching, compatibility is maintained between the fine detail resolvability necessary at the transmitter station scanner in order to preserve thin line material, and the less stringent requirements in the ability of the receiver station scanner to reproduce the received picture material.

The invention will be fully apprehended from the following detailed description of certain illustrative embodiments thereof taken in connection with the appended drawings in which.

Figures 1, 2:
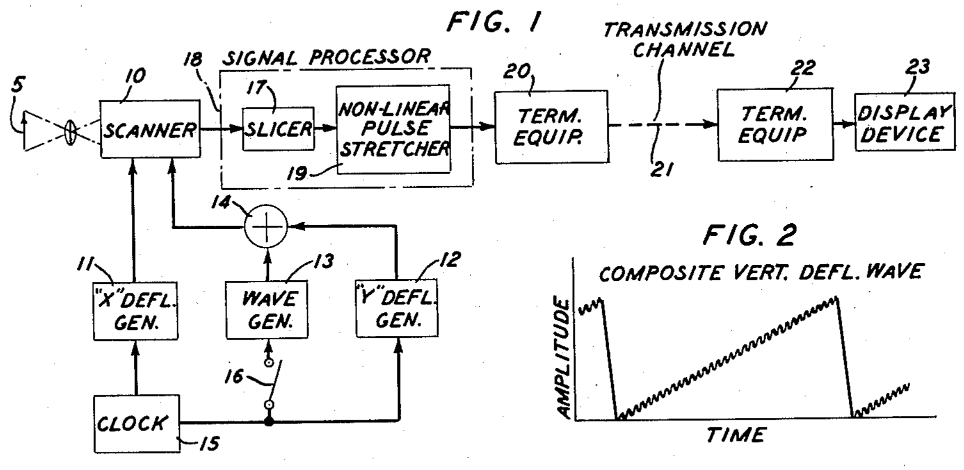
Fig. 1 is an overall block schematic diagram showing the relation of various circuit units employed in the practice of the invention.
Fig. 2 is a graph showing a composite wave suitable for deflecting a scanning aperture in accordance with the invention.

Referring now to Fig. 1, a simple image communication system in accordance with the invention employs scanner apparatus 10 for converting an optical image of a field of view 5 into a complex electrical image signal as a function of time. Apparatus of this type is well known in the facsimile and television arts and need not be described. Such apparatus may be fully electronic or electromechanical. In either case, exploration of the elemental areas in the field by means of a scanning aperture or spot of light is accomplished by repeatedly and systematically deflecting the aperture over selected paths in the field. Accordingly, the aperture is repeatedly deflected in one coordinate direction, for example, the X direction, by the application of suitable waves from X deflection generator 11, and in a second coordinate direction, for example, the Y direction, by waves from Y deflection generator 12. In well-known fashion, the X deflection frequency is *n* times the Y deflection frequency where *n* is the number of X direction lines scanned by the aperture per field.

The required resolving ability of the scanner is dictated by the finest material found in the pictorial matter to be transmitted. As a typical example, a bank signature card or a printed account card may contain thin inked lines which may measure no more than five mils in width. A scanning aperture of relatively smaller size, e.g., two mils diameter is required to resolve such thin lines without a loss in peak amplitude. On the other hand, since not many such fine lines are closely spaced and since a reproduction even with increased thickness lines is much to be preferred to one in which the lines are completely lost, the transmitter scanner resolution need not exceed, for example, 80 lines per inch. If the scanning aperture is, for example, two mils in height and adjacent scanning lines are separated by 12.5 mils, that is, the scanning line pitch is 12.5 mils, there remains an unexplored area 10.5 mils wide between them. Thus, thin object lines may easily be overlooked in scanning the field with a high resolution scanning aperture at the scanning line pitch indicated.

To overcome this, while retaining the high resolution capability of a two mil scanning aperture both in the horizontal and vertical directions, it is in accordance with the present invention to oscillate the aperture rapidly in the Y direction during each horizontal line scan. To insure that the maximum number of resolvable picture elements in the overall field of view are explored without, however, producing distortion in the picture, the peak-to-peak amplitude of oscillation is made to equal the pitch of the ordinary scanning line paths of the field of view. Although the frequency of oscillation may be as high as desired, it is sufficient that it be at least twice the bandwidth accommodated by the transmission channel. This insures that the aforementioned intercept angles are widely distributed and that the angles between the scanning paths and picture contours are maintained largely above zero.

The additional vertical deflection component is produced in wave generator 13. The wave, which may be a sinusoid, a sawtooth or the like, is combined with the sawtooth wave derived from deflection generator 12 in adder 14 before application to the Y deflection circuitry of scanner 10. Both deflection generator 11 and deflection generator 12 are synchronized by pulses emanating from a suitable clock generator 15. If desired, the wave generator 13 may be locked in synchronism by clock pulses applied to the generator through switch 16.

While the scanning path followed by the aperture is most easily made sinusoidal with respect to the horizontal deflection paths, it is to be understood that any similar form of additional vertical deflection may be employed. In particular, the scanning techniques described in A. D. Blumlein, Patent 2,222,934, November 26, 1940, may be employed in the practice of the present invention.

Even though the exploration of thin lines within the object field by a small aperture produces undiluted output pulses, many of these may be too short in duration for satisfactory transmission over the available reduced bandwidth channel. Accordingly, the analogue signals derived from the scanner 10 are converted to pulses by passing them through slicer 17 included in signal processing unit 18. The resulting pulses are established at one or the other of two discrete amplitude levels corresponding, for example, to background for one value and to inked lines for the other. Loss of these pulses is prevented without the attendant disadvantages outlined above by suitably modifying the durations of the shortest of these pulses in pulse stretcher 19 prior to transmission. In a preferred stretching program, the duration of all pulses whose durations are less than D, i.e., pulses representative of fine lines in the subject copy, are stretched to the minimum duration D so that the peak amplitude of the pulses is satisfactorily accommodated by the transmission channel. The minimum duration D is selected to equal the duration of a single period of oscillation of the aperture and corresponds, for example, to the resolution capability of the channel. This period is termed a Nyquist interval and is equal to the reciprocal of two times the frequency bandwidth accommodated by the channel. The selected minimum duration D guarantees that a thin line which is embraced by the scanning aperture only on one extreme of the aperture excursion, that is, once for each complete period of oscillation, is still preserved without dilution.

These signals are then placed in suitable form for transmission in terminal equipment 20, which may include the necessary modulators and transformers for coupling the signals to a program transmission channel, whereupon they may be transmitted in conventional fashion over channel 21 to a receiving station.

Receiving terminal equipment 22 includes the necessary transformers and demodulating units for preparing the received signals for utilization. Noise components may be removed, if desired, by subjecting the demodulated pulses to correction in a conventional slicer (not shown) before applying the signals to a display device 23. No reconversion of the received pulses to their original unmodified form is necessary, and no beam oscillation of any kind need be used. The received pulses may immediately be applied to the display device 23 wherein they are all treated alike and converted through the action of a normally large scanning beam following conventional straight line scanning paths into a visible image of the subject copy on a record medium. This medium may comprise any physical medium on which an image of the subject copy is reproduced such as, for example, electrostatic or electrothermal material. It preferably comprises a direct recording surface forming a part of a cathode beam tube using electrical storage. Direct view or display storage tubes suitable for this purpose are well known and may comprise, for example, one of the class of devices known commercially as the "Iatron" bright trace storage tube, or one of the devices of the class known as "Dark Trace Tubes," and the like.

Fig. 2 illustrates a typical composite vertical deflection wave of the form produced by the addition in adder 14 of high frequency waves derived from the wave generator 13 and low frequency Y direction deflection waves derived from deflection generator 12. One complete vertical sweep with fast fly-back is illustrated.

Figure 3:
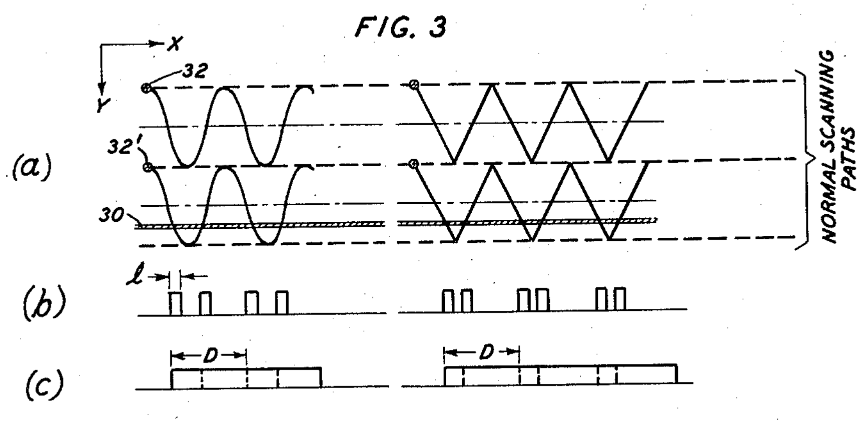
Fig. 3 is a group of graphs helpful in explaining the high definition scanning system and the nonlinear modifying program used in the practice of the invention.

In order the better to understand the operation of the invention, it will be helpful to refer to Fig. 3 in which *a* illustrates a portion of a field of view which includes a thin dark line 30 extending in the X direction. The widely spaced scanning paths normally traversed by an aperture 32, suitably dimensioned to resolve adequately both X direction and Y direction detail in the narrow band system outlined above, are indicated by dashed lines. For the typical scanning line pitch illustrated, the line 30 is missed entirely. The undulating paths followed by the aperture according to the present invention, are illustrated with solid lines. Two examples, a sinusoidal segment and a sawtooth segment, are shown in portions of each of two adjacent scanning paths. Other paths may, of course, be followed. For the scanning line pitch indicated by the dashed lines, the line 30 is embraced by the aperture during its traverse of the field of view with either the sinusoidal or sawtooth motion but not with a straight line motion.

If the amplitude of oscillation is equal to the pitch of the normal scanning lines, that is, equal to the separation between the axes of adjacent scanning paths, the finite size of the aperture produces a band of overlap equal to one-half of the Y dimension of the scanning aperture. In the most general case, an output signal derived from an object line positioned between the axes of two successive scans will exceed the slicing level for only one of these two scans. That is to say, the signal produced in one scan is above the slicing level and will produce a full output pulse and the one produced in the other is below the slicing level and will produce zero output. Only in the rare case in which such a line exactly straddles the band of overlap of two adjacents scans, will there be any indecision; this may result in the line being picked up in both scans or in neither of them. It may, in certain applications, be preferable to alter the degree of overlap, i.e., increase it or decrease it, depending on whether the risk of double registration or zero registration is of greater consequence.

To insure further that the scanning path is at all times quite different from any contours or object lines found in the pictoral matter being scanned, particularly if the same material is scanned repetitively, the oscillation frequency is preferably selected to be a non-integer multiple of the X and Y scanning frequencies. Hence, a difference in phase exists between the aperture undulations of adjacent lines or of corresponding lines in successive frames. For those cases in which this phase displacement is undesirable the undulations may be synchronized to the scanning frequency by locking the wave generator 13 of Fig. 1 to the frequency of clock generator 15. A switch 16 is provided for this purpose.

Line *b* of Fig. 3 illustrates the sequence of pulses derived in scanning the field illustrated at *a*. The sequence comprises a series of unidirectional pulses of duration *l*, which duration is a function of the Y dimension of the line 30 and the frequency and amplitude of the oscillation of the aperture. To insure successful passage of these short duration pulses through a narrow band channel, they are established at a first amplitude level for areas within the pictorial material with densities below a preassigned value and at a second level for all areas with densities above the preassigned value. Any form of a two-level slicer, well known in the art, may be used for this purpose. Preferably, the first level is set to correspond to low density background information and the second level for information of substantially greater densities, e.g., ink lines and the like.

Each pulse established at the second value having a duration less than a preassigned minimum, determined by the accommodation of the transmission channel, is converted to a pulse whose duration is equal to or greater than the preassigned minimum. All pulses greater than the minimum are transmitted without modification. According to a preferred form of the invention, the duration D is selected to be just equal to, or slightly less than, a Nyquist interval. With an oscillation period equal to twice the Nyquist interval, the selected duration D is equal to one period of undulation. Line *c* of Fig. 3 illustrates the pulses of line *b* after processing.

The orientation of line 30 with respect to the axis of oscillation of the aperture 32 may give rise to two closely spaced pulses for each cycle of exploration by the aperture. Both of these pulses are shorter in duration than the preassigned minimum duration D and consequently both are stretched to that value. In the limiting case in which only one pulse is produced in each full cycle of undulation, it is stretched sufficiently to persist to the start of the next pulse so that the two are blended together into a single pulse. Thus, all pulses in the entire line are blended into their neighbors with the ultimate result that a sequence of adjoining pulses persist for the entire extent of the line 30 in the X direction. For the case in which D is less than a full cycle of undulation, slight serrations in the train of pulses may be produced. However, the enlarged scanning aperture at the reproducer device effectively blends adjacent pulses into a single continuous one. The error due to overshoot at the end of the line 30 is never more than the period D which is also the resolution capability of the system.

Figure 4:
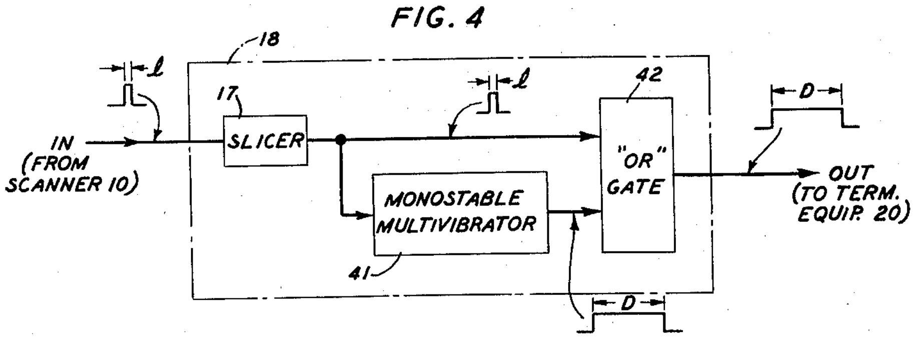
Fig. 4 is a block schematic diagram of a simple illustrative signal processing unit.

Simplified apparatus for processing analogue signals according to the invention is shown in Fig. 4. The electrical signals developed in the scanner are passed first through conventional two-level slicer 17 and then impressed on two paths. The first path includes a monostable multivibrator 41 having a relaxation period equal to D. In conventional fashion, the leading edge of any input pulse triggers the multivibrator which in turn completes one cycle of oscillation in a period D and produces an output square wave pulse of duration D. The output of the multivibrator is coupled directly to an "Or" logic circuit 42. This circuit may comprise any of the "Or" type gate circuits well known in the computer art. It is characteristic of these circuits that so long as there is an input signal impressed on one or the other of its two input terminals, there will be a signal at its output terminal. The second path couples the signal from the slicer 17 directly to the second input of "Or" circuit 42. In operation, an incoming pulse, assumed to be positive and of duration *l* in this illustration, reverses the state of multivibrator 41 for a period D, and energizes the "Or" circuit 42 for a period of duration *l*. The "Or" circuit output consequently is held positive so long as either the pulse of duration *l* or the pulse of duration D persists. The later pulse to expire, after an elapsed time D or *l*, whichever is the greater, controls the output pulse duration. In the event that a second pulse appears at the input before the pulse of duration D has expired from the first triggering, the two pulses will emerge as a single pulse lasting from the beginning of the first to the end of the second. The pulses emerging from "Or" gate 42, of whatever duration, are clean rectangular pulses corresponding to the dark portions of the pictorial material. They are eminently suitable for application to terminal equipment 20 and ultimately for transmission to a receiver station with a minimum of signal degradation.

Although the invention has been described with reference to certain specific embodiments, numerous modifications and other applications will readily occur to those skilled in the art.

What is claimed is:

1. In combination, means for repeatedly scanning an image field of view with an aperture having smaller linear dimensions than the finest pictorial detail in said field to obtain a sequence of signal pulses representative of the light values of said field, means for oscillating said aperture in a direction transverse to the direction of scanning throughout the duration of each successive traverse of said field thereby to increase substantially the total area explored in each said traverse, means supplied with the succession of signal pulses resulting from said scanning for quantizing said pulses, and means for stretching to a period D the duration of those of said quantized pulses whose durations are less than said period and for passing in unaltered form those of said quantized pulses whose durations are equal to or greater than said period, thereby to form a modified sequence of pulses whereby said pulses as modified may be transmitted over a narrow band transmission channel without an excessive loss of peak amplitudes.

2. In combination, means for exploring parallel paths in an image field of view with an aperture having smaller linear dimensions than the finest pictorial detail in said field to obtain a sequence of signal pulses representative of the light values of said field, said parallel paths being spaced apart by a distance substantially greater than the linear dimensions of said aperture, means operating simultaneously with said means for exploring parallel paths for exploring portions of said field that lie alongside of said parallel paths thereby to increase substantially the total area explored in each traverse of said field of view, means supplied with the succession of signal pulses resulting from said successive explorations for restricting individual ones of said pulses to one of two discrete amplitude levels, means supplied with said restricted pulses for increasing to a preassigned period D the durations of those of said pulses whose durations are less than said period to form a sequence of modified pulses, and means for reproducing all of said modified pulses in said sequence alike, thereby to construct therefrom a reproduction of said field of view.

3. In a visual communication system for the transmission of signals over a narrow band channel, means at a transmitter station for repeatedly scanning substantially parallel lines in an image field of view with a spot having smaller linear dimensions than the finest detail in said field to obtain a sequence of signal pulses representative of the light values of said field, means for oscillating said spot in a direction transverse to said direction of scanning throughout the duration of each successive scanning of said field, and means supplied with the succession of signal pulses resulting from said scanning for stretching to a period D the duration of those of said pulses whose durations are less than said period D to form a modified pulse sequence, means for conveying said modified pulse sequence to a receiver station, and means at said receiver station for converting said resulting modified sequence of said pulses into a visible image.

4. The system as defined in claim 3 wherein each pulse of said sequence is established at one or the other of two discrete amplitude levels.

5. The system as defined in claim 3 wherein the frequency of oscillation of said spot is equal to at least two times the useful bandwidth of said narrow band channel.

6. The system as defined in claim 3 wherein the peak-to-peak amplitude of the undulating path followed by said spot throughout each successive scanning of said field is equal to the separation between adjacent ones of said parallel scanning lines.

7. In a visual communication system for the transmission of pictorial copy over a narrow band channel, a scanning element for exploring said pictorial copy, means for imparting to said scanning element a first component of motion to cause said element to progress along a first linear path thereby to scan a line in said field of view, means for imparting to said element a second component of motion to cause said element to undulate in a direction transverse to said first direction of progression, means for deriving from said scanning element electrical time signals, and means for modifying said electrical time signals for transmission, said modifying means including means for electrically increasing the duration of selected ones of said time signals to a preassigned minimum value, and for retaining the original duration of the remaining ones of said time signals.

8. In a system as defined in claim 7, means at a receiver station for utilizing said electrical time signals as modified to construct a reproduction of said pictorial copy.

9. The system defined in claim 7 wherein said second component of motion causes said element to undulate at a frequency which is a non-integer multiple of the scanning frequency of said first component of motion.

10. In combination with apparatus as defined in claim 7, a generator for producing clock pulses, means for synchronizing said means for imparting said first component of motion to said scanning element with said clock pulses, means for synchronizing said means for imparting said second component of motion to said scanning element with said clock pulses, and bi-impedance means for synchronizing in one impedance state said means for imparting said third component of motion to said scanning element with said clock pulses.

11. The visual communication system as defined in claim 7 wherein said means for modifying said electrical time signals includes means for converting said electrical time signals derived from said scanning element to two-valued electrical signals.

References Cited in the file of this patent

UNITED STATES PATENTS

| | | |
|---|---|---|
| 2,222,934 | Blumlein | Nov. 26, 1940 |
| 2,625,604 | Edson | Jan. 13, 1953 |
| 2,653,237 | Johnstone | Sept. 22, 1953 |